(12) United States Patent
Umeda et al.

(10) Patent No.: US 10,062,920 B2
(45) Date of Patent: Aug. 28, 2018

(54) POWDER SUPPLYING DEVICE AND ELECTRODE MANUFACTURING APPARATUS

(71) Applicants: Masahiro Umeda, Toyota (JP); Yasuhiro Sakashita, Nissin (JP); Koichi Tanihara, Miyoshi (JP); Naohiro Hasama, Kamakura (JP); Ryo Nakatani, Kawasaki (JP)

(72) Inventors: Masahiro Umeda, Toyota (JP); Yasuhiro Sakashita, Nissin (JP); Koichi Tanihara, Miyoshi (JP); Naohiro Hasama, Kamakura (JP); Ryo Nakatani, Kawasaki (JP)

(73) Assignees: TOYOTA JIDOSHA KABUSHIKI KAISHA, Toyota-shi, Aichi-ken (JP); Zeon Corporation, Tokyo (JP)

( * ) Notice: Subject to any disclaimer, the term of this patent is extended or adjusted under 35 U.S.C. 154(b) by 14 days.

(21) Appl. No.: 14/779,677

(22) PCT Filed: Mar. 11, 2014

(86) PCT No.: PCT/IB2014/000273
§ 371 (c)(1),
(2) Date: Sep. 24, 2015

(87) PCT Pub. No.: WO2014/155168
PCT Pub. Date: Oct. 2, 2014

(65) Prior Publication Data
US 2016/0056493 A1 Feb. 25, 2016

(30) Foreign Application Priority Data

Mar. 25, 2013 (JP) .................... 2013-062752

(51) Int. Cl.
*H01M 10/04* (2006.01)
*B05C 19/06* (2006.01)
(Continued)

(52) U.S. Cl.
CPC ......... *H01M 10/0404* (2013.01); *B05B 5/081* (2013.01); *B05B 5/084* (2013.01);
(Continued)

(58) Field of Classification Search
CPC ....... B05C 19/06; B05C 19/008; B05C 19/04; B05C 11/023; H01M 10/0404;
(Continued)

(56) References Cited

U.S. PATENT DOCUMENTS 1,371,343 A * 3/1921 Bow .................. A01C 7/16
222/317
2,681,637 A * 6/1954 Simpson .............. D21H 3/64
118/308
(Continued)

FOREIGN PATENT DOCUMENTS

CN 1691372 A 11/2005
CN 201158706 Y 12/2008
(Continued)

OTHER PUBLICATIONS

English Translation of JP 2004 281221 (Murate et al) published Oct. 7, 2004.*
(Continued)

*Primary Examiner* — Laura E Edwards
(74) *Attorney, Agent, or Firm* — Sughrue Mion, PLLC

(57) ABSTRACT

A powder supplying device (2) includes a case (6) in which a storage portion (6a) is formed for temporarily storing powder (10), the case (6) having an inlet (6b) formed in an upper end of the storage portion (6a), and a rectangular outlet (6c) formed in a lower end of the storage portion (6a);

(Continued)

a rotor (7) that is arranged in the case (6) and transports the powder (10) in the storage portion (6*a*) to the outlet (6*c*) by rotating; and a mesh body (8) through which the powder (10) that has been transported to the outlet (6*c*) passes. The powder supplying device (2) supplies the powder (10) onto an upper surface of an electrode foil (5). The rotor (7) has a brush-like shape, with a plurality of hair members (7*b*) radially implanted pointing radially outward with an axial center (G) of the rotor (7) as the center.

3 Claims, 7 Drawing Sheets

(51) Int. Cl.
*B05B 5/08* (2006.01)
*B05C 19/04* (2006.01)
*H01M 4/04* (2006.01)
*B30B 15/30* (2006.01)
*B05C 19/00* (2006.01)
*B05B 5/16* (2006.01)
*B05B 7/14* (2006.01)
*B05B 5/04* (2006.01)
*B05C 11/02* (2006.01)

(52) U.S. Cl.
CPC ............ *B05C 19/008* (2013.01); *B05C 19/04* (2013.01); *B05C 19/06* (2013.01); *B30B 15/308* (2013.01); *H01M 4/0435* (2013.01); *B05B 5/0418* (2013.01); *B05B 5/1683* (2013.01); *B05B 7/144* (2013.01); *B05C 11/023* (2013.01); *Y10S 118/16* (2013.01)

(58) Field of Classification Search
CPC .... H01M 4/0435; B30B 15/308; B05B 5/081; B05B 5/0418; B05B 5/1683; B05B 7/144; B28B 11/06; B28B 11/04; B41M 1/125; B41M 1/22; B41M 1/28; B41M 1/42; G03G 13/08; G03G 15/0805; Y10S 118/16

USPC ....... 118/308, 621, DIG. 16, 301; 222/181.1, 222/185.1, 235, 410, 460–462; 239/650, 239/658, 665, 679, 681; 141/1.1, 32, 141/256; 399/252, 287
See application file for complete search history.

(56) References Cited

U.S. PATENT DOCUMENTS

| | | | | |
|---|---|---|---|---|
| 4,492,321 | A | * | 1/1985 | Zoltner ................... G01F 11/24 222/410 |
| 5,355,794 | A | | 10/1994 | Freudenheim |
| 5,996,855 | A | * | 12/1999 | Alexander ................ B05B 3/02 118/621 |
| 2005/0241137 | A1 | | 11/2005 | Suzuki et al. |

FOREIGN PATENT DOCUMENTS

| | | |
|---|---|---|
| EP | 2903058 A1 | 8/2015 |
| FR | 2099256 A5 | 3/1972 |
| JP | 07-135023 A | 5/1995 |
| JP | 2000-079361 A | 3/2000 |
| JP | 2002-177865 A | 6/2002 |
| JP | 2003-155124 A | 5/2003 |
| JP | 2004-281221 A | 10/2004 |
| JP | 2005-183423 A | 7/2005 |
| JP | 2005-340188 A | 12/2005 |
| JP | 2008-152946 A | 7/2008 |
| JP | 2010-287545 A | 12/2010 |
| JP | 2013-012327 A | 1/2013 |
| JP | 2013-031978 A | 2/2013 |
| JP | 2014-067530 A | 4/2014 |

OTHER PUBLICATIONS

English Translation of JP 2013 031978 (Nishimura et al) published Feb. 14, 2013.*

* cited by examiner

FIG. 5
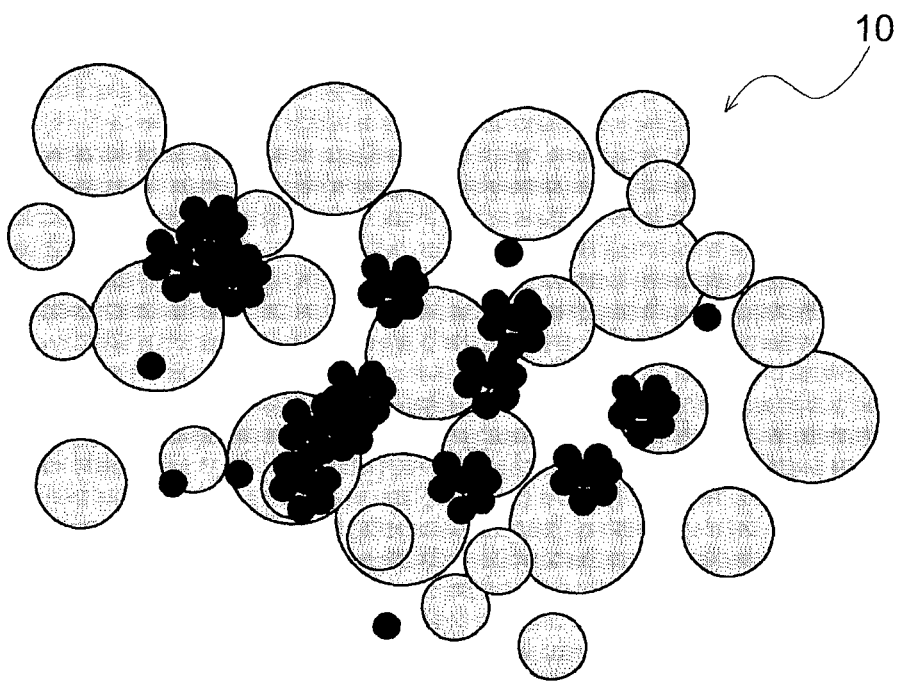
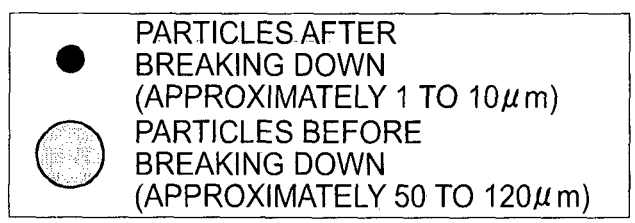

POWDER SUPPLYING DEVICE AND ELECTRODE MANUFACTURING APPARATUS

BACKGROUND OF THE INVENTION

1. Field of the Invention

The invention relates to technology of a powder supplying device for supplying an even amount of powder onto an upper surface of a sheet-like receiving member, and an electrode manufacturing apparatus provided with this powder supplying device.

2. Description of Related Art

A powder supplying device that is a device for supplying powder while dispersing the powder evenly is known. For example, Japanese Patent Application Publication No. 2003-155124 (JP 2003-155124 A), described below, describes just such technology.

The powder supplying device according to JP 2003-155124 A is a device that continuously supplies powder onto a sheet, and includes a chute for pouring powder, a rolling member provided in the chute, and a mesh body provided on a lower portion of the chute. Also, this powder supplying device supplies powder while it, via the mesh body, by vibrating the chute and rolling the rolling member in the chute.

However, with the powder supplying device according to JP 2003-155124 A, the flowability of the powder differs depending on the state of the powder that is poured into the chute, so the amount of powder that is supplied will be not be constant even if the chute is vibrated the same.

Also, the powder supplying device of the related art is configured to break up and disperse the powder that has been loaded into the powder supplying device, by applying shearing force to the powder using rotational force of a rotor or the like, so the particles that form the powder may end up being broken down by the shearing force that is applied. If the particles are broken down into microparticles, the flowability of the powder will deteriorate. Therefore, the powder supplying device of the related art that is configured to apply shearing force using a rotor is not able to easily supply the powder while evenly dispersing it.

SUMMARY OF THE INVENTION

The invention thus provides a powder supplying device capable of supplying powder while evenly dispersing it, while inhibiting particles that form the powder from being broken down, and an electrode manufacturing apparatus provided with this powder supplying device.

That is, a first aspect of the invention relates to a powder supplying device that includes a i) case in which a storage portion is formed as a cavity for temporarily storing powder that is a substance to be supplied, the case having an inlet formed in an upper end of the storage portion, the inlet being an opening for filling the powder, and the case having an outlet formed in a lower end of the storage portion, the outlet being a rectangular opening for discharging the powder; ii) a rotor that is arranged in the case and that transports the powder in the storage portion to the outlet by rotating; and iii) a mesh body that covers a lower end of the outlet and through which the powder that has been transported to the outlet passes. A receiving member that is an object to which the powder is supplied is displaced horizontally vertically below the outlet. The powder supplying device supplies the powder, while dropping the powder from the outlet, onto an upper surface of the receiving member. The rotor has a brush-like shape, with a plurality of hair members radially implanted pointing radially outward with an axial center of the rotor as the center.

In the first aspect of the invention, the powder is able to be dispersed evenly without breaking down the particles that form the powder. Also, by sweeping off powder adhered to the inner wall of the storage portion and the mesh body using the brush-like rotor, powder is able to be prevented from accumulating in the storage portion and clogging the mesh body, so a stable supply state can be maintained.

In the above aspect of the invention, the plurality of hair members may have conductivity.

In the above aspect of the invention, the powder is able to be dispersed evenly without breaking down the particles that form the powder. Also, by sweeping off powder adhered to the inner wall of the storage portion and the mesh body using the brush-like rotor, powder is able to be prevented from accumulating in the storage portion and clogging the mesh body, so a stable supply state can be maintained.

In the above aspect of the invention, the powder supplying device may also include a first discharge electrode that performs corona discharge with respect to the powder that has passed through the mesh body.

In the above aspect of the invention, the powder is able to be dispersed even more evenly.

In the above aspect of the invention, the powder supplying device may also include a squeegee that evens out the powder deposited on the upper surface of the receiving member.

In the above aspect of the invention, the powder is able to be dispersed even more evenly.

In the above aspect of the invention, the powder supplying device may also include a second discharge electrode that performs corona discharge with respect to the receiving member before the powder is deposited, and a suction portion that sucks up foreign matter that has separated from the receiving member due to the corona discharge by the second discharge electrode.

In the above aspect of the invention, the powder is able to be dispersed even more evenly.

In the above aspect of the invention, the powder may be granulated particles, and the granulated particles may include electrode active material, binder, and conductive material.

In the above aspect of the invention, even if the particles that form the powder are granulated particles that tend to break down easily, the powder is able to be evenly dispersed without breaking down the particles.

A second aspect of the invention relates to an electrode manufacturing apparatus that includes a powder supplying device that includes i) a case in which a storage portion is formed as a cavity for temporarily storing powder that is a substance to be supplied, the case having an inlet formed in an upper end of the storage, portion, the inlet being an opening for filling the powder, and the case having an outlet formed in a lower end of the storage portion, the outlet being a rectangular opening for discharging the powder; ii) a rotor that is arranged in the case and that transports the powder in the storage portion to, the outlet by rotating; and iii) a mesh body that covers a lower end of the outlet and through which the powder that has been transported to the outlet passes, a receiving member that is an object to which the powder is supplied being displaced horizontally vertically below the outlet, and the powder supplying device supplying the powder, while dropping the powder from the outlet, onto an upper surface of the receiving member; a transport device that transports the receiving member; a press device that presses the receiving member that has been supplied with the powder by the powder supplying device and transported by the transport device. The rotor has a brush-like shape, with a plurality of hair members radially implanted pointing radially outward with an axial center of the rotor as the center.

In the second aspect of the invention, an electrode is able to be manufactured by evenly dispersing powder, without breaking down the particles that form the powder. As a result, a mixture layer with an even thickness is able to be formed, so the quality of the electrode is able to be improved.

BRIEF DESCRIPTION OF THE DRAWINGS

Features, advantages, and technical and industrial significance of exemplary embodiments of the invention will be described below, with reference to the accompanying drawings, in which like numerals denote like elements, and wherein:

FIG. 5 is an enlarged view showing a frame format of particles that form a powder that is a substance to be supplied by the powder supplying device, and the broken-down state of these particles;

DETAILED DESCRIPTION OF EMBODIMENTS

Figure 1:
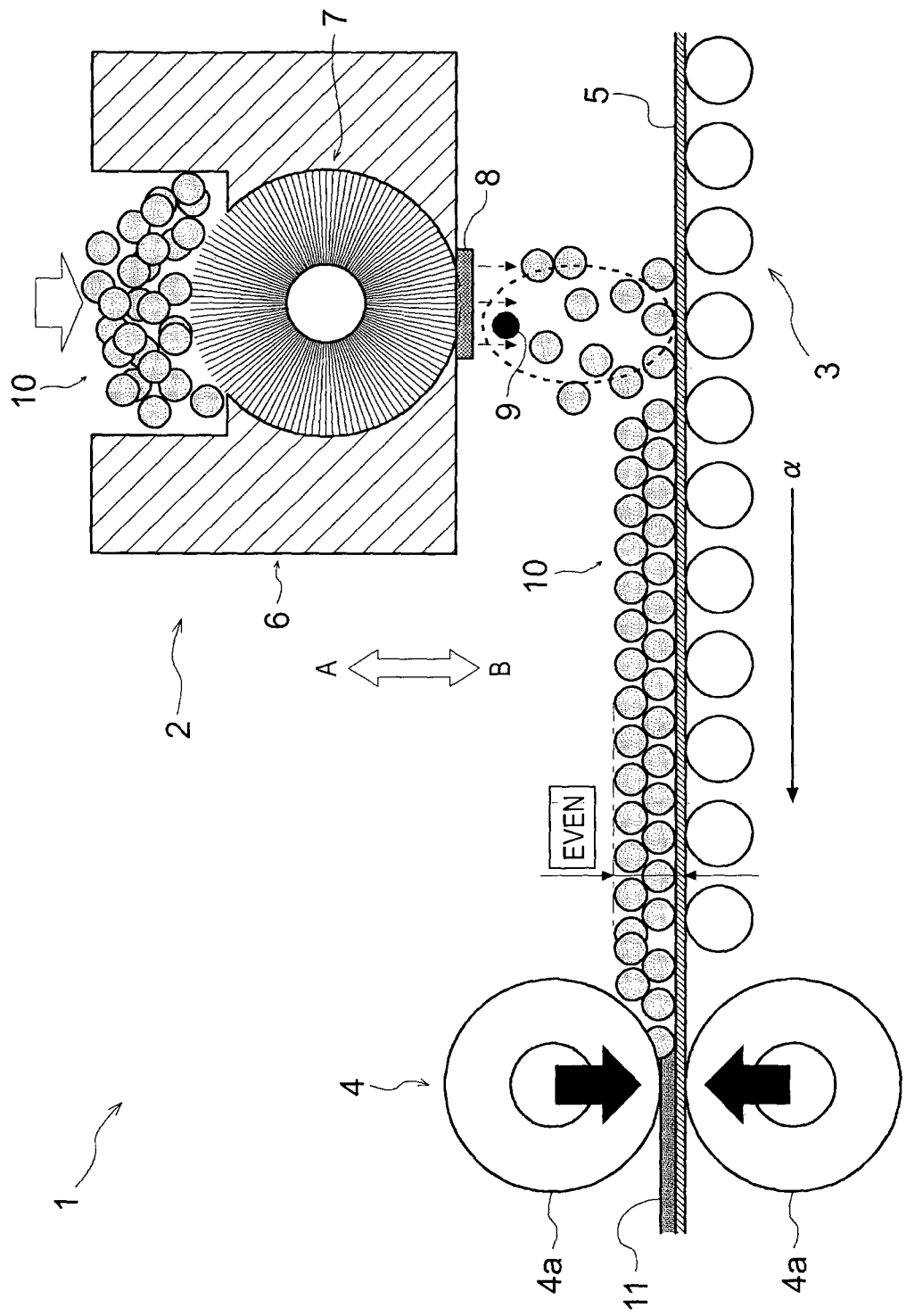
FIG. 1 is a view showing a frame format of an electrode manufacturing apparatus provided with a powder supplying device according to a first example embodiment of the invention.

Next, example embodiments of the invention will be described. First, the overall structure of an electrode manufacturing apparatus provided with a powder supplying device according to a first example embodiment of the invention will be described with reference to FIGS. 1 to 4. In the description below, the direction of arrow A in FIG. 1 is defined as being vertically upward, and the direction of arrow B in FIG. 1 is defined as being vertically downward. Also, with the electrode manufacturing apparatus illustrated in this example embodiment, the powder is deposited on an upper surface of a receiving member that is positioned lower than the powder supplying device by being supplied while being dropped down from above by the powder supplying device.

As shown in FIG. 1, the electrode manufacturing apparatus 1 according to one example embodiment is an apparatus for manufacturing an electrode for a secondary battery.

The electrode manufacturing apparatus 1 manufactures the electrode for a secondary battery not by an electrode paste being applied to an electrode foil (i.e., not by a wet method), but by a dry method in which powder that includes electrode active material is pressed onto a surface of electrode foil.

The electrode manufacturing apparatus 1 includes a powder supplying device 2 according to the first example embodiment of the invention, a transport device 3, and a press device 4 and the like. The electrode manufacturing apparatus 1 is configured to deposit a powder 10 on an upper surface of an electrode foil 5 that serves as a receiving member by supplying the powder 10 to the electrode foil 5 with the powder supplying device 2, while the electrode foil 5 is transported at a constant speed in a horizontal predetermined feed direction α by the transport device 3.

Also, with the electrode manufacturing apparatus 1, a mixture layer 11 that includes electrode active material is formed on the upper surface of the electrode foil 5 by compressing the powder 10 with the press device 4 when the powder 10 is deposited at a uniform density and height on the upper surface of the electrode foil 5.

More specifically, the press device 4 of the electrode manufacturing apparatus 1 includes a pair of pressure rollers 4a that have parallel axes. The press device 4 is configured to form the mixture'layer 11 on the upper surface of the electrode foil 5 by pressing, and thus compressing, the powder 10 by passing the powder 10 and the electrode foil 5 through a gap set between the pressure rollers 4a. The gap set between the pressure rollers 4a is a small distance in proportion to the deposition height of the powder 10, and the size of the gap is set taking into account the desired thickness of the mixture layer 11 and the pressure to be applied to the powder 10 and the like.

In this example embodiment, a case is illustrated in which the powder supplying device 2 is used with the electrode manufacturing apparatus 1 for manufacturing an electrode for a secondary battery, but the use of the powder supplying device of the invention is not limited to this. That is, the powder supplying device according to the invention may be widely used for the purpose of evenly supplying a powder-like substance that is to be supplied.

As shown in FIG. 1, the powder supplying device 2 according to the first example embodiment of the invention is a device capable of evenly dispersing and supplying a fixed amount of the powder 10 to the electrode foil 5 that serves as the receiving member, and includes a case 6, a rotor 7, a mesh body 8, and a discharge electrode 9 and the like. The phrase "evenly disperse" in this example embodiment means that the weight per unit area of the powder 10 on the upper surface of the electrode foil 5 is even at a given portion.

Also, a powder replenishing device and a powder amount detection sensor and the like, neither of which is shown, are attached to the powder supplying device 2. Also, with the powder supplying device 2, the amount of powder 10 stored in the case 6 is detected by the powder amount detection sensor, not shown, and when the powder 10 in the case 6 falls below a predetermined amount, the powder 10 is replenished by the powder replenishing device, not shown, such that the powder 10 in the case 6 is maintained at or above the predetermined amount.

The case 6 of the powder supplying device 2 is arranged directly below the powder replenishing device, not shown, such that the powder 10 that is supplied and dropped from the powder replenishing device is able to be received by the case 6. Also, the powder 10 is dropped and supplied from the case 6 onto the electrode foil 5 that is arranged vertically below the case 6 and is displaced in the predetermined feed direction α. The powder 10 is dropped and either falls naturally by its own weight, or falls while being urged by being pushed by the rotor 7.

The case 6 is a case for temporarily storing the powder 10 that is supplied from the powder replenishing device, and forms a storage portion 6a that is a cavity for storing the powder 10. Also, the case 6 is configured such that an inlet 6b that is an opening for introducing the powder 10 is formed in an upper end portion of the storage portion 6a, and an outlet 6c that, is an opening for discharging the powder 10 is formed in a lower end portion of the storage portion 6a.

Figure 3A:
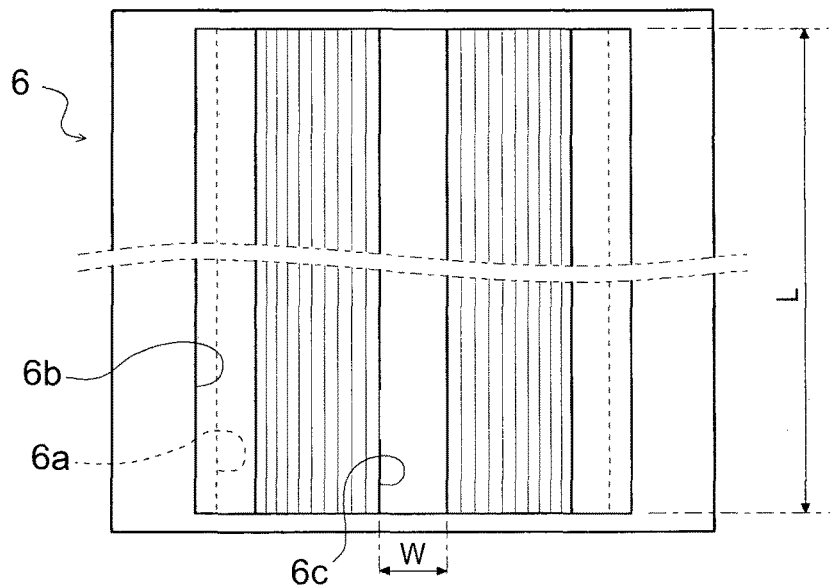
FIG. 3A is an explanatory plan view showing a frame format of a case that forms the powder supplying device according to the first example embodiment of the invention.
Figure 3B:
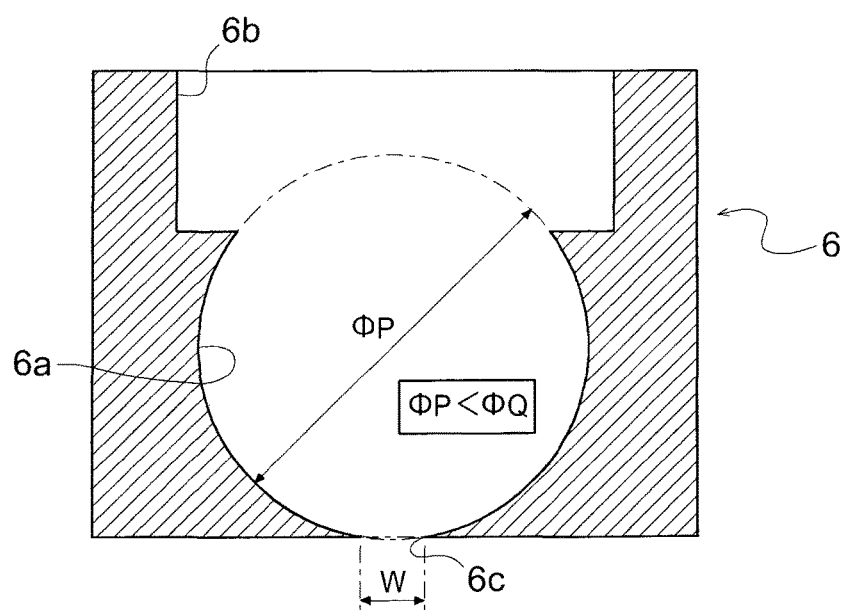
FIG. 3B is an explanatory sectional view showing a frame format of the case that forms the powder supplying device according to the first example embodiment of the invention.

The outlet 6c is a rectangular-shaped opening that is communicated with the storage portion 6a. As shown in FIGS. 3A and 3B, the outlet 6c is formed as a rectangular-shaped opening, with the dimension in the length direction (i.e., the direction of the long side in this example embodiment) designated L, and the dimension in the width direction (i.e., the direction of the short side in this example embodiment) designated W. A lower end surface of the outlet 6c is formed horizontal, and the amount of powder 10 discharged from the outlet 6c is even at each portion of the outlet 6c. Also, the outlet 6c is arranged such that the width direction thereof is parallel to the feed direction α of the electrode foil 5, and the length direction thereof is a direction that is orthogonal to the feed direction α of the electrode foil 5 when viewed from above (see FIG. 1).

Also, with the powder supplying device 2 according to the first example embodiment of the invention, the mesh body 8 that is a member that equally divides the outlet 6c in a mesh shape is arranged on a lower portion of the outlet 6c, so as to cover the entire outlet 6c. This powder supplying device 2 is able to even out the distribution and density of the powder 10 by reliably dispersing the powder 10 that is clumped (i.e., that is in clumps) by passing the powder 10 that falls from the outlet 6c through the mesh body 8. As a result, the powder supplying device 2 more reliably evens out the weight of the powder 10 adhered to the surface of the electrode foil 5.

Figure 2:
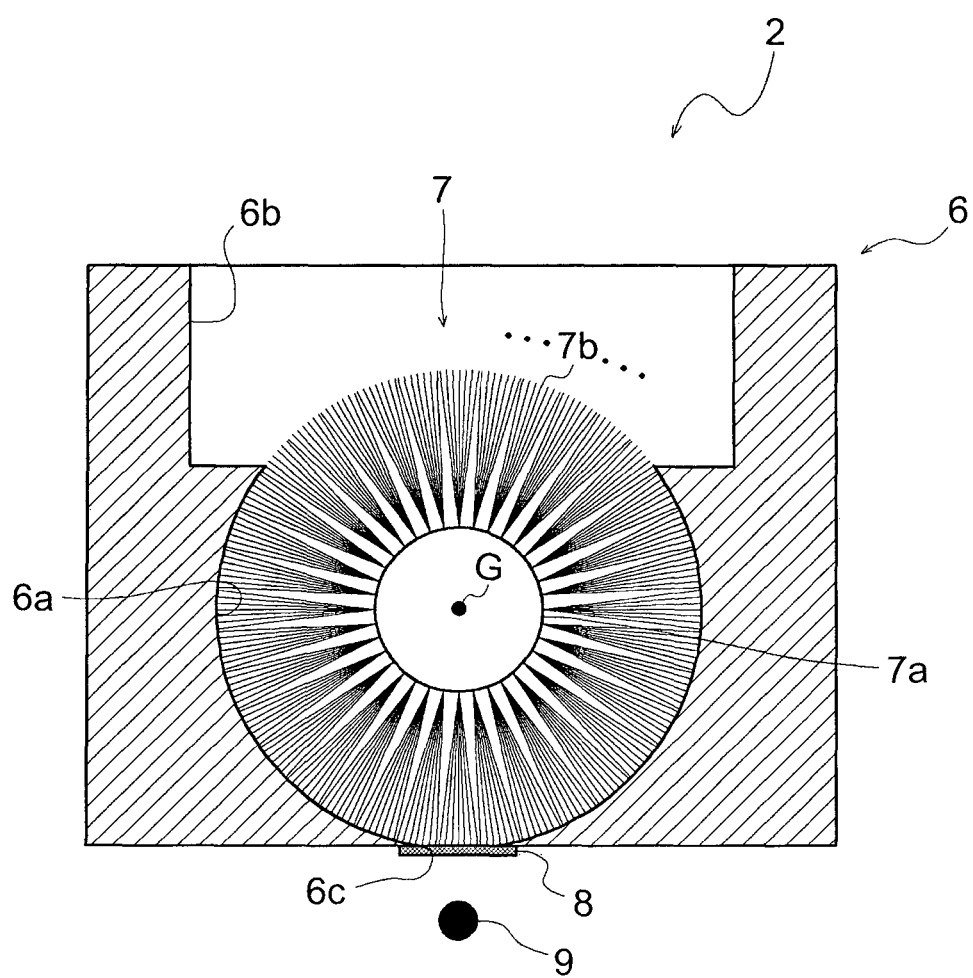
FIG. 2 is a view showing a frame format of the overall structure of the powder supplying device according to the first example embodiment of the invention.

Also, as shown in FIG. 2, with the powder supplying device 2 according to the first example embodiment of the invention, the rotor 7 is arranged in the storage portion 6a of the case 6. This rotor 7 is arranged in a portion of the storage portion 6a midway between the inlet 6b and the outlet 6c. As is shown in FIG. 2, the rotor 7 is arranged in a portion of the storage portion 6a such that the rotor 7 projects at least partially through the inlet 6b of the storage portion 6a. The rotor 7 is configured to be able to carry the powder 10 deposited on an upper portion (i.e., the inlet 6b side) of the rotor 7 to a lower portion (i.e., the outlet 6c side) of the rotor 7 by the rotor 7 rotating.

Figure 4:
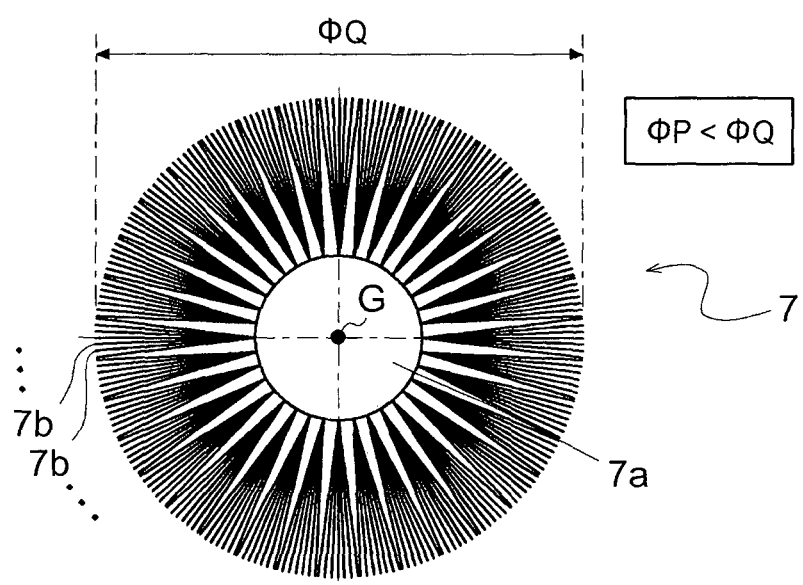
FIG. 4 is a side view showing a frame format of a rotor that forms the powder supplying device according to the first example embodiment of the invention.

The rotor 7 of the powder supplying device 2 is a generally brush-shaped member in which the outer shape has a generally circular cylindrical shape, as shown in FIG. 4, and includes a shaft portion 7a and a plurality of hair members 7b. Also, the rotor 7 is configured such that, in the storage portion 6a, the shaft portion 7a is parallel to the length direction of the outlet 6c, and the shaft portion 7a is horizontally supported in a manner so as to be able to rotate around the shaft portion 7a of the rotor 7 while pointing in a direction orthogonal to the feed direction α of the electrode foil 5, when viewed from above.

Also, the plurality of hair members 7b are implanted in the shaft portion 7a of the rotor 7, in a radial fashion centered around the axial center G of the shaft portion 7a. The hair members 7b are hair-like bodies that have elasticity. The plurality of hair members 7b collectively form a tussock (i.e., tuft), such that the powder 10 becomes caught between the hair members 7b in this tussock. Thus, the hair members 7b are configured to be able to hold the powder to the rotor 7. The amount of powder 10 held to the rotor 7 may be adjusted by changing the thickness, number, elasticity, and implant density and the like of the hair members 7b.

Further, a diameter φQ of a circumscribed circle of the hair members 7b of the rotor 7 is larger than a diameter φP of an inscribed circle of the storage portion 6a, as shown in FIG. 3B. When placed in the storage portion 6a, the hair members 7b of the rotor 7 are compressed and bent in the radial direction such that the tips of the hairs are in constant contact with the inside surface of the storage portion 6a. With this kind of structure, powder 10 that is adhered to the inner wall surface of the storage portion 6a is continually swept off by the hair members 7b, so the powder 10 is able to be prevented from adhering to the inner wall of the storage portion 6a.

Also, with the case 6 that forms the powder supplying device 2, the outlet 6c is formed farther toward the inside than the inscribed circle of the storage portion 6a, so the tips of the hairs of the hair members 7b contact the inside (i.e., the upper side) of the mesh body 8 that is provided on the outlet 6c. Also, with this kind of structure, powder 10 that piles up on the mesh body 8 is continually swept off by the hair members 7b, which prevents the mesh body 8 from becoming clogged with the powder 10.

Moreover, the hair members 7b of the powder supplying device 2 are formed by conductive material, so the powder 10 is prevented from being electrically attracted to the hair members 7b and not being able to separate from them (i.e., the hair members 7b). Having the hair members 7b be conductive so as to enable the powder. 10 to freely separate from the hair members 7b enables the powder 10 to be more reliably evenly dispersed by the powder supplying device 2.

Furthermore, with the powder supplying device 2 according to the first example embodiment of the invention, the discharge electrode 9 that performs corona discharge with respect to the powder 10 that falls through the mesh body 8 is provided below the mesh body 8. This discharge electrode 9 is arranged in an area corresponding to the length L of the outlet 6c, below the outlet 6c.

The particles that form the powder 10 adhere to one another and form clumps (i.e., the clumped powder 10). Such clumps may impede the powder 10 from being evenly dispersed.

However, when corona discharge is performed by the discharge electrode 9, a charge builds up on the surface of the particles that form the powder 10 such that the particles electrically repel one another, thus making it possible to break up the powder. Therefore, with the powder supplying device 2, clumps are prevented from forming in the powder 10 by dispersing the powder 10 using the discharge electrode 9, so the powder 10 that falls from the mesh body 8 will not be disproportionately distributed.

Also, the powder supplying device 2 includes the rotor 7, the mesh body 8, and the discharge electrode 9, so when the powder 10 that has been supplied from the outlet 6c toward the electrode foil 5 is in a state adhered to the supply surface (i.e., the upper surface) of the electrode foil 5, the weight of the powder 10 per unit area of the supply surface is constant.

With the powder supplying device 2 according to the first example embodiment of the invention described here, there is only one supply system for the powder 10 (i.e., there is only one powder outlet in the case), but the powder supplying device of the invention may also be configured to have a plurality of systems of storage portions and rotors and the like, and supply powder to a receiving member from a plurality of outlets.

Here, the property of the powder 10 that is the substance to be supplied by the powder supplying device 2 according to the first example embodiment of the invention will be described with reference to FIG. 5. The powder 10 that is the substance to be supplied by the powder supplying device 2 that is provided in the electrode manufacturing apparatus 1 is formed by granulated particles manufactured from a variety of substances for forming the mixture layer 11 on the surface of the electrode foil 5 that is the receiving member, and includes electrode active material, binder, and conductive material and the like.

As shown in FIG. 5, each particle that forms the powder 10 has a particle diameter of approximately 50 to 120 and has a property in which it is able to easily be broken down by the application of shearing force. Also, when the particles that form the powder 10 break down, microparticles having a particle diameter of approximately 1 to 10 μM are formed, and these microparticles enter the spaces and the like between the particles and fill in these spaces. As a result, the flowability of the powder 10 decreases, and clumps of powder 10 tend to form.

This decrease in flowability of the powder 10 and the formation of clumps of powder 10 may impede the powder 10 from being evenly dispersed by the powder supplying device 2, so a structure that will not break down the particles that form the powder 10 is required for the rotor 7 that is used in the powder supplying device 2.

Therefore, the powder supplying device 2 according to the first example embodiment of the invention employs the rotor 7 that has the plurality of hair members 7b and is brush-shaped. This rotor 7 is configured such that the powder 10 is ensnared by the elastic hair members 7b, and the hair members 7b are able to be displaced and deform so the shearing force applied to the powder 10 is less, and thus the particles that form the powder 10 are not as easily broken down, compared to the related art. This kind of structure prevents a decrease in the flowability of the powder 10, so the powder 10 is able to be more reliably evenly dispersed by the powder supplying device 2.

Next, a change over time in the amount of powder supplied by the powder supplying device 2 according to the first example embodiment of the invention will be described with reference to FIG. 6. Here, the powder supplying device 2 according to the first example embodiment of the invention and a powder supplying device according to the related art will be compared and described. The powder supplying device of the related art used in the test illustrated here includes a generally circular cylindrical rotor in which grooves are formed at equal intervals in the circumferential direction (referred to as a "groove-type rotor"), as the rotor.

Figure 6:
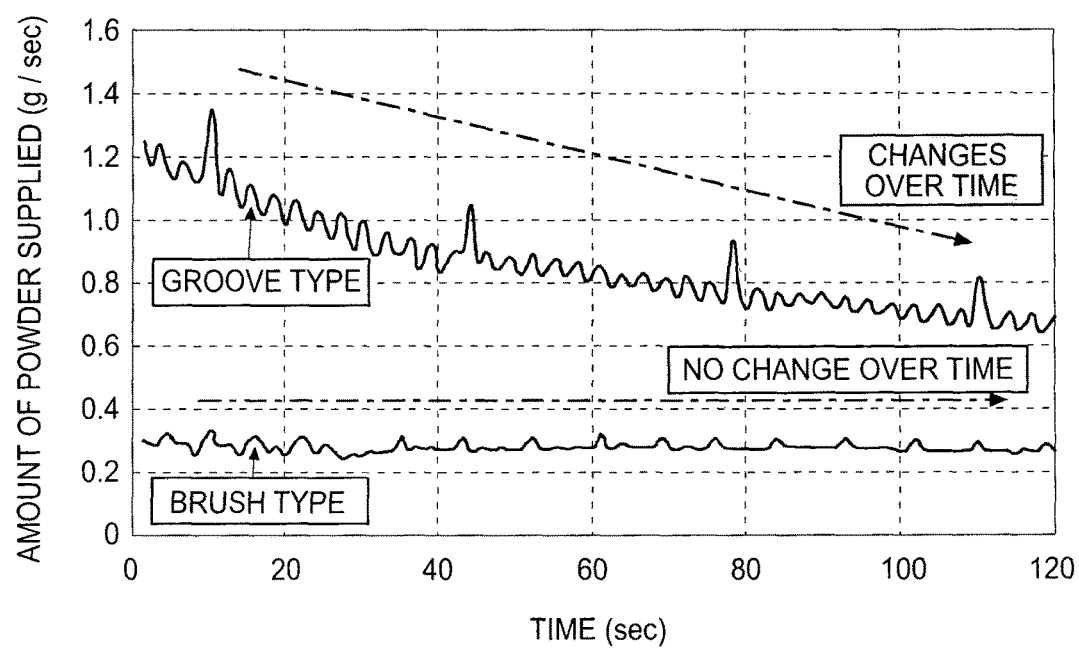
FIG. 6 is a view illustrating a change over time in the amount of powder supplied by the powder supplying device.

As shown in FIG. 6, when supplying the powder 10 using the powder supplying device of the related art that has the groove-type rotor, it was confirmed that the amount of powder 10 supplied gradually decreases over time when the powder 10 continues to be supplied. This is thought to be because with the groove-type, rotor, the powder 10 adhered to the mesh body 8 is unable to be swept off, so the powder 10 gradually clogs the mesh body 8, and as a result, the amount of powder 10 supplied by the powder supplying device decreases.

On the other hand, as shown in FIG. 6, when supplying the powder 10 with the powder supplying device 2 that has the rotor 7 in which the plurality of hair members 7b are implanted (i.e., a brush-type rotor), it was confirmed that the amount of powder 10 supplied does not decrease over time even when the powder 10 continues to be supplied. This is thought to be because with the brush-type rotor 7, the powder 10 that has adhered to the mesh body 8 is able to be swept away, so the powder 10 does not clog the mesh body 8, and therefore, the amount of powder 10 supplied by the powder supplying device 2 does not decrease.

That is, with the powder supplying device 2 that has the brush-like rotor 7, it is possible to prevent the supply state of the powder 10 from changing over time, so the powder 10 can continue to be supplied while being evenly dispersed.

That is, the powder supplying device 2 according to the first example embodiment of the invention includes i) the case 6 in which the storage portion 6a that is a space for temporarily storing, the powder 10 that is the substance to be supplied is formed, and that has the inlet 6b that is an opening for filling the powder 10 formed in the upper end of the storage portion 6a, and the outlet 6c that is a rectangular opening for discharging the powder 10 formed in the lower end of the storage portion 6a, ii) the rotor 7 that is arranged in the case 6 and transports the powder 10 in the storage portion 6a to the outlet 6c by rotating, and iii) the mesh body 8 through which the powder 10 that has been transported to the outlet 6c passes and, that covers the lower end of the outlet 6c. The powder supplying device 2 supplies the powder 10, while dropping the powder 10 from the outlet 6c, onto the upper surface of the electrode foil 5 that serves as the object that receives the powder 10 and that is horizontally displaced vertically below the outlet 6c. The rotor 7 has a brush-like shape, with a plurality of hair members 7b implanted in a generally radial fashion pointing radially outward with the axial center G of the rotor 7 as the center.

Further, in the powder, supplying device 2 according to the first example embodiment of the invention, the hair members 7b are conductive.

According to the powder supplying device 2 having this kind of structure, the powder 10 is able to be evenly dispersed without breaking up the particles that form the powder 10. Also, with the powder supplying device 2, the powder 10 that adheres to the mesh body 8 and the inner wall of the storage portion 6a is able to be swept off by the brush-like rotor 7, so accumulation of the powder 10 in the storage portion 6a and the clogging of the mesh body 8 by the powder 10 are able to be prevented, so a stable supply state is able to be maintained.

The powder supplying device 2 according to the first example embodiment of the invention also includes the discharge electrode 9 that performs corona discharge with respect to the powder 10 that has passed through the mesh body 8.

With the powder supplying device 2 having this kind of structure, the powder 10 is able to be more evenly dispersed.

Also, the powder 10 that is the substance to be supplied of the powder supplying device 2 according to the first example embodiment of the invention is granulated particles that include electrode active material, binder, and conductive material.

With the powder supplying device 2 having this kind of structure, even if the particles that form the powder 10 are granulated particles that break down more easily, the powder 10 is able to be evenly dispersed without the particles breaking down.

Also, the electrode manufacturing apparatus 1 according to the example embodiment of the invention is provided with the powder supplying device 2 that includes i) the case 6 in which the storage portion 6a is formed as a cavity for temporarily storing the powder 10 that is the substance to be supplied, the case 6 having the inlet 6b that is an opening for filling the powder 10 and is formed in an upper end of the storage portion 6a, and an outlet 6c that is a rectangular opening for discharging the powder 10 and is formed in a lower end of the storage portion 6a; ii) the rotor 7 that is arranged in the case 6 and that transports the powder 10 in the storage portion 6a to the outlet 6c by rotating; and iii) the mesh body 8 that covers a lower end of the outlet 6c and through which the powder 10 that has been transported to the outlet 6c passes. The powder supplying device 2 supplies the powder 10, while dropping the powder 10 from the outlet 6c, onto an upper surface of the electrode foil 5 that serves as the object to which the powder 10 is supplied and that is displaced horizontally vertically below the outlet 6c. The electrode manufacturing apparatus 1 is also provided with a transport device 3 that transports the electrode foil 5, and a press device 4 that presses the electrode foil 5 that has been supplied with the powder 10 by the powder supplying device 2 and transported by the transport device 3. The rotor 7 has a brush-like shape, with the plurality of hair members 7b radially implanted pointing generally radially outward with the axial center G of the rotor 7 as the center.

According to the electrode manufacturing apparatus 1 having this kind of structure, an electrode is able to be manufactured by evenly dispersing the powder, without breaking up the particles that form the powder 10, and consequently, the mixture layer 11 is able to be formed with an even thickness, so the quality of the electrode is able to be improved.

Figure 7:
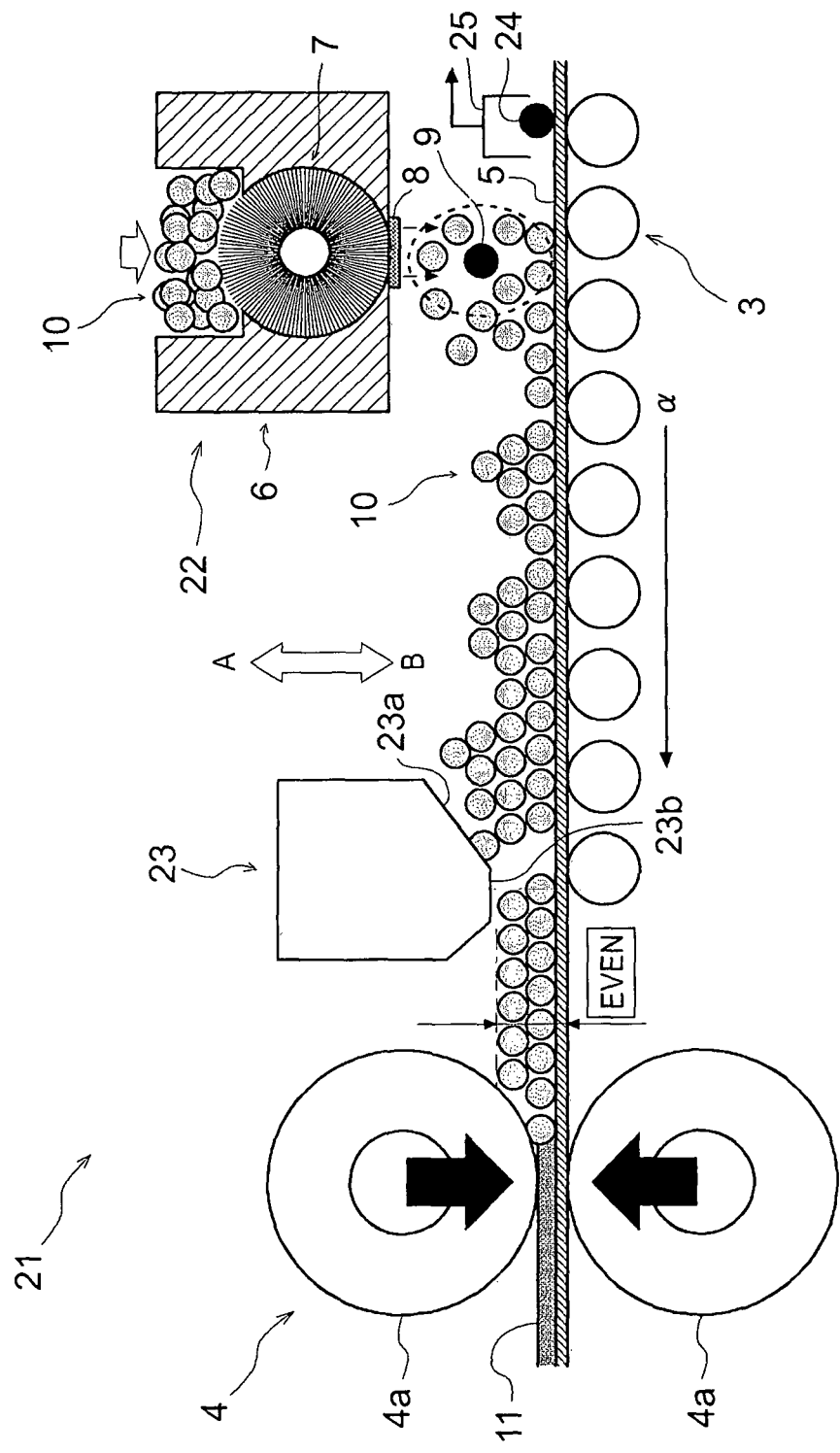
FIG. 7 is a view showing a frame format of an electrode manufacturing apparatus provided with a powder supplying device according to a second example embodiment of the invention.

Next, the overall structure of an electrode manufacturing apparatus that is provided with a powder supplying device according to a second example embodiment of the invention will be described with reference to FIG. 7. In the description below, the direction of arrow A in FIG. 7 is defined as being vertically upward, and the direction of arrow B in FIG. 7 is defined as being vertically downward. Also, with the electrode manufacturing apparatus illustrated in this example embodiment, powder is supplied onto a receiving member arranged below the powder supplying device by being dropped from above.

As shown in FIG. 7, an electrode manufacturing apparatus 21 according to the another example embodiment of the invention manufactures an electrode for a secondary battery by a dry method, just like the electrode manufacturing apparatus 1, and includes a powder supplying device 22 according to the second example embodiment of the invention.

The powder supplying device 22 according to the second example embodiment of the invention includes a case 6, a rotor 7, a mesh body 8, and a first discharge electrode 9, similar to the powder supplying device 2 according to the first example embodiment of the invention. In addition, the powder supplying device 22 according to the second example embodiment of the invention also includes a squeegee 23, a second discharge electrode 24, and a suction device 25 and the like, which is different from powder supplying device 2 according to the first example embodiment of the invention.

The squeegee 23 is a portion for evening out the powder 10 deposited on the electrode foil 5 to a predetermined deposition height. The squeegee 23 is arranged on the downstream side of the case 6 in the direction in which the electrode foil 5 is transported, and the gap between the electrode foil 5 and the lower end of the squeegee 23 is a predetermined distance. Also, the squeegee 23 is provided in an area corresponding to the area of the length L of the outlet 6c, and has an inclined portion 23a that is a portion that reduces the gap toward the downstream side, provided on the upstream side of the electrode foil 5, and a horizontal portion 23b that forms a horizontal surface that continues from the inclined portion 23a, provided on the downstream side of the inclined portion 23a. The squeegee 23 evens out the powder 10 deposited on the upper surface of the electrode foil 5 with the inclined portion 23a and the horizontal portion 23b, and evens out the deposition height of the powder 10 before it is sent to the press device 4, with the horizontal portion 23b that makes the gap with the electrode foil 5 the predetermined distance.

The second discharge electrode 24 is a discharge electrode for performing corona discharge with respect to the electrode foil 5, and is arranged on the upstream side of the case 6 in the direction in which the electrode foil 5 is transported. With the powder supplying device 22, foreign matter other than the powder 10 adhered to the electrode foil 5 is removed by performing corona discharge with respect to the electrode foil 5 by the second discharge electrode 24. Also, the powder supplying device 22 is configured such that foreign matter is removed by performing corona discharge with respect to the electrode foil 5 before the powder 10 is supplied, so the powder 10 is supplied from the case 6 to the electrode foil 5 in a state in which there is no foreign matter on the electrode foil 5.

Also, the powder supplying device 22 is configured such that the suction device 25 is arranged on an immediately upper portion of the second discharge electrode 24. The suction device 25 includes a hood-like portion that covers the second discharge electrode 24, and suction equipment (such as vacuum piping and an exhaust duct) that is connected to the hood-like portion, and the like, on an upper portion of the second discharge electrode 24.

With the powder supplying device 22, a charge is applied by the second discharge electrode 24 and foreign matter repelled by the electrode foil 5 is sucked up by the suction device 25, thus preventing this foreign matter from adhering again to the electrode foil 5, and thus enabling the powder 10 to be more reliably supplied from the case 6 to the electrode foil 5 in a state in which there is no foreign matter on the electrode foil 5.

That is, the powder supplying device 22 according to the second example embodiment of the invention also includes the squeegee 23 that evens out the powder 10 deposited on the upper surface of the electrode foil 5.

Also, the powder supplying device 22 according to the second example embodiment of the invention also includes the second discharge electrode 24 that performs corona discharge with respect to the electrode foil 5 before the powder 10 is deposited, and the suction device 25 that sucks up foreign matter that has separated from the electrode foil 5 due to the corona discharge by the second discharge electrode 24.

Thus, with the powder supplying device 22 having this kind of structure, the powder 10 is able to be more evenly dispersed.

The invention claimed is:

1. A powder supplying device comprising:
 a case in which a storage portion is formed as a cavity for temporarily storing powder that is a substance to be supplied, the case having an inlet formed in an upper end of the storage portion, the inlet being an opening for filling the powder, and the case having an outlet formed in a lower end of the storage portion, the outlet being a rectangular opening for discharging the powder;

a rotor that is arranged in the storage portion of the case and that transports the powder in the storage portion to the outlet by rotating, the rotor projecting at least partially through the inlet of the case;

a mesh body that covers a lower end of the outlet and through which the powder that has been transported to the outlet passes;

a first discharge electrode disposed below the outlet and that performs corona discharge with respect to the powder that has passed through the mesh body;

a squeegee disposed downstream of the case, above a receiving member and that evens out the powder deposited on an upper surface of the receiving member;

a second discharge electrode disposed upstream of and below the outlet and that performs corona discharge with respect to the receiving member before the powder is deposited; and a suction portion disposed above the second discharge electrode and that sucks up foreign matter that has separated from the receiving member due to the corona discharge by the second discharge electrode, wherein the receiving member to which the powder is supplied, is located vertically below the outlet;

the powder supplying device supplies the powder, while dropping the powder from the outlet, onto the upper surface of the receiving member, and the rotor has a brush-like shape, with a plurality of hair members radially implanted pointing radially outward with an axial center of the rotor as the center.

2. The powder supplying device according to claim 1, wherein the plurality of hair members have conductivity.

3. An electrode manufacturing apparatus comprising:

a powder supplying device that includes (i) a case in which a storage portion is formed as a cavity for temporarily storing powder that is a substance to be supplied, the case having an inlet formed in an upper end of the storage portion, the inlet being an opening for filling the powder, and the case having an outlet formed in a lower end of the storage portion, the outlet being a rectangular opening for discharging the powder; (ii) a rotor that is arranged in the storage portion of the case and that transports the powder in the storage portion to the outlet by rotating, the rotor projecting at least partially through the inlet of the case; and (iii) a mesh body that covers a lower end of the outlet and through which the powder that has been transported to the outlet passes a receiving member to which the powder is supplied, being located vertically below the outlet, and the powder supplying device supplying the powder, while dropping the powder from the outlet, onto an upper surface of the receiving member;

a first discharge electrode disposed below the outlet and that performs corona discharge with respect to the powder that has passed through the mesh body;

a squeegee disposed downstream of the case, above the receiving member and that evens out the powder deposited on an upper surface of the receiving member;

a second discharge electrode disposed upstream of and below the outlet and that performs corona discharge with respect to the receiving member before the powder is deposited; and a suction portion disposed above the second discharge electrode and that sucks up foreign matter that has separated from the receiving member due to the corona discharge by the second discharge electrode a transport device that transports the receiving member horizontally;

a press device that presses the receiving member that has been supplied with the powder by the powder supplying device and transported by the transport device, wherein the rotor has a brush-like shape, with a plurality of hair members radially implanted pointing radially outward with an axial center of the rotor as the center.

* * * * *